United States Patent [19]
Laine

[11] Patent Number: 5,920,253
[45] Date of Patent: Jul. 6, 1999

[54] LOCAL AREA METHOD ARRANGEMENT

[76] Inventor: Seppo Laine, Riihitie 8, FIN-00330 Helsinki, Finland

[21] Appl. No.: 08/793,851
[22] PCT Filed: Sep. 5, 1995
[86] PCT No.: PCT/FI95/00489
 § 371 Date: Mar. 10, 1997
 § 102(e) Date: Mar. 10, 1997
[87] PCT Pub. No.: WO96/08096
 PCT Pub. Date: Mar. 14, 1996

[30] Foreign Application Priority Data

Sep. 9, 1994 [FI] Finland ................................ 944180

[51] Int. Cl.⁶ .............................. H04B 1/00; H04L 27/00
[52] U.S. Cl. .............................. 340/310.01; 340/310.02; 340/310.06; 375/259
[58] Field of Search ........................ 340/310.01, 310.02, 340/310.06

[56] References Cited

U.S. PATENT DOCUMENTS

| | | | |
|---|---|---|---|
| 4,131,882 | 12/1978 | Hollabaugh et al. | 340/310.01 |
| 4,348,582 | 9/1982 | Budek | 340/310.01 |
| 4,408,185 | 10/1983 | Rasmussen | 340/310.02 |
| 4,535,401 | 8/1985 | Penn | 340/310.02 |
| 4,599,598 | 7/1986 | Komoda et al. | 340/310.02 |
| 5,003,457 | 3/1991 | Ikei et al. | 340/310.02 |

FOREIGN PATENT DOCUMENTS

| | | |
|---|---|---|
| 018334 | 10/1980 | European Pat. Off. . |
| 038877 | 11/1981 | European Pat. Off. . |
| 516210 | 12/1992 | European Pat. Off. . |
| 616451 | 9/1994 | European Pat. Off. . |
| 7902250-5 | 8/1983 | Finland . |
| 469959 | 10/1993 | Finland . |
| 1575026 | 9/1980 | United Kingdom . |
| WO 81/02962 | 10/1981 | WIPO . |
| WO 87/06380 | 10/1987 | WIPO . |
| WO 93/18568 | 9/1993 | WIPO . |

*Primary Examiner*—Donnie L. Crosland
*Attorney, Agent, or Firm*—Smith, Gambrell & Russell, Beveridge, DeGrandi, Weilacher & Young Intellectual Property Group

[57] ABSTRACT

A local area network arrangement is taught for implementing a control system. The local area network arrangement includes a low-voltage bus composed of a cable pair, functioning as a common transmission path of the network, a plurality of connection units connecting the bus to operating devices to be controlled by the network, and a control unit common to the operating devices, connected to the bus, for controlling the operating devices. Data is transmitted in the network both from the control unit to the connection units, and from the connection units to the control unit. More particularly, the control units send to the bus a constant-frequency carrier signal whereby a number of cycles of the carrier signal form a transmission frame, in which each connection unit corresponds to a particular cycle of the frame. Also, for at least part of the cycles of the transmission frame, one half of each cycle is used for transmitting data to one specific connection unit, and the other half is used for transmitting power to all connection units.

11 Claims, 5 Drawing Sheets

LOCAL AREA METHOD ARRANGEMENT

BACKGROUND OF THE INVENTION

1. Field of the Invention

The invention relates to a local area network arrangement in accordance with the preamble of the attached claim 1. Unlike with conventional local area networks, in which performance (data transfer rate) is of importance, the local area network-of the invention is specifically intended for bidirectional transmission of slow data, in particular for bidirectional transmission of switch information (ON/OFF). The local area network arrangement of the invention is primarily developed for mains power control of real estates, but it also has other remarkable uses, such as access control systems and other monitoring or control systems. In the following, however, the background of the invention will be described with reference to an example of a mains control system of a real estate, as problems related to it have originally given an impulse to the invention.

2. Description of the Related Art

The greatest drawback of real estate electrification implemented in the conventional way is the fact that it does not enable "intelligent" installation that would allow flexible control and variability of the system. FIG. 1 illustrates the principle of the conventional installation technique. A separate conduit usually leads from a main distribution board 11 for each group of light fittings or wall sockets. In the figure, the number of the wires required is indicated with a number marked beside the cross line drawn across the wire, as usual; 2 or 3 wires are led to a switch 13 from each light fitting 12, and two wires are required for each group. In the example shown in the figure, a total number of 8 wires thus lead to the main distribution board (wall sockets are marked with reference number 14). An installation of this kind is simple, but also extremely fixed, and requires a professional for making modifications.

BRIEF SUMMARY AND OBJECTS OF THE INVENTION

For achieving controllability, a relay-controlled installation technique must be used, the principle of which is illustrated in FIG. 2. As the switches (relays) of all the outlets (e.g. light fittings) to be controlled are in this case situated in the main distribution board 11, as many wires must lead outwards from the distribution board, as there are outlets to be controlled in the building. As typically three or four wires are required for each push-button (switch) 15 equipped with a signal light, the number of wires going out from the main distribution board will be very large. For instance, electrification of a typical detached house requires a number of 25 . . . 50 push-buttons equipped with a signal light, in which case from these buttons alone, 75. 200 wires lead to the main distribution board. As to the number of wires, the relay-controlled installation technique thus mainly resembles a telephone exchange. Furthermore, it requires a highly experienced electrician, the installation time rises remarkably long, and the costs rise extremely high.

The object of the present invention is thus to achieve an improvement to the above-mentioned drawbacks, and provide such a local area network arrangement that enables a flexible, distributed control system, which may be implemented in a much more simple manner than the prior system. This object is achieved with the local area network arrangement of the invention.

The idea of the invention is to convey in a bus (twin cable) of the network such a signal that ensures a similar response time to all control functions, and at the same time enables a simultaneous bidirectional data transmission and power feed, so that an individual node of the network may be kept (e.g. in terms of timing, and transmitter devices) as simple as possible. When one half of a carrier signal cycle (which signal is substantially sinusoidal in its basic form in accordance with a preferred embodiment of the invention) is entirely preserved from power feed, it is possible to transfer data in two directions during it. This may be applied in a very simple manner in one direction on the basis of current information, and in the other direction on the basis of the waveform of the signal.

The-prior systems do not offer the users (e.g. the owner of the dwelling or the real estate) any possibilities to change the installation configuration (e.g. which switch controls which light fitting), whereas the solution in accordance with the invention enables changes of this kind without a help of an experienced and licensed electrician from outside. In addition, different additional functions, such as timer function, dimmer switch function, centralized switch on and switch off etc. may be added to any of the outlets to be controlled.

As the network of the invention has a low voltage and it is freely adaptable, the user may freely add push-buttons (switches) to the desired places, for example, and program them to operate the electric outlets he wants to.

Compared with the conventional installation technique, the solution of the invention reduces the need of thick copper wire required, as the switches no longer need to be wired to the line voltage, but a low-voltage signal may be connected to them. A more remarkable saving, however, is achieved in the installation time and thus the installation costs.

Compared with the above-described relay-controlled system, the main advantage of the solution of the invention is a much simpler installation technique, and thus a remarkable cost saving.

In the network of the invention, a (analog) carrier is transferred, in which the rise and fall times are relatively long compared with e.g. short rise and fall times of digital signals of known local area networks. It is also possible to keep the interferences (interference spectrum) occurring in the network small. By means of a constant-frequency carrier, it is also possible to transfer timing to all nodes of the network, and separate timing means are thus not needed in the node.

BRIEF DESCRIPTION OF THE DRAWINGS

In the following, the invention and its preferred embodiments are disclosed in greater detail with reference to the examples in FIGS. 3 . . . 9 in the attached drawings, in which.

DETAILED DESCRIPTION OF THE INVENTION

Figure 3:
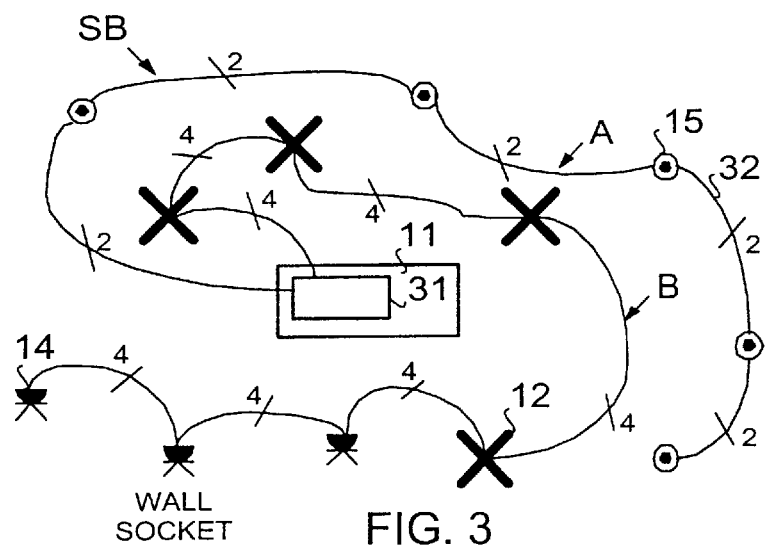
FIG. 3 shows electrification implemented by means of the installation technique of the invention.

FIG. 3 shows the principle of an electrification implemented by means of the local area network in accordance with the present invention. The only part of the system possessing "intelligence" is a control unit 31 common to all operating devices to be controlled. The control unit may be located e.g. in a main distribution board 11. A twisted pair 32 that may in principle extend through the entire system forms a common transmission link i.e. a bus SB of the system, to which bus different controllable operating devices (an operating device may comprise e.g. a push-button 15 equipped with a signal light, or a light fitting 12) are connected by means of connection units described below. An operating device and the electronics related thereto are herein generally referred to as a node. This electronics includes the above-mentioned connection unit through which the operating device is connected to the network, and adapter circuitry depending on the type of the operating device and possibly required in addition, for controlling the operating device.

All push-buttons 15 equipped with signal lights are chained in the example in accordance with FIG. 3 along one conduit A, only one twisted pair 32 running inside it. Line voltage light fittings and wall sockets are chained in fuse groups in their own conduits, one conduit B going out from the main distribution board being shown in FIG. 3. One twisted pair 32 is installed in the same conduit along with the phase/neutral mains cable for conveying the switching control to each of the operating devices of the group.

Only 6 wires thus lead to the main distribution board in the example in accordance with FIG. 3. An additional advantage is the suitability of the system for any of the present electrical conduits.

Figure 1:
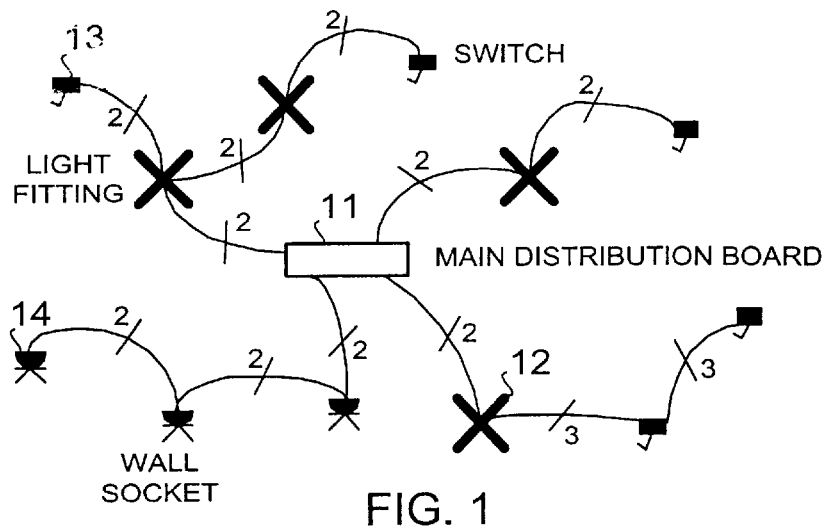
FIG. 1 shows electrification implemented by means of a conventional electric installation technique.
Figure 2:
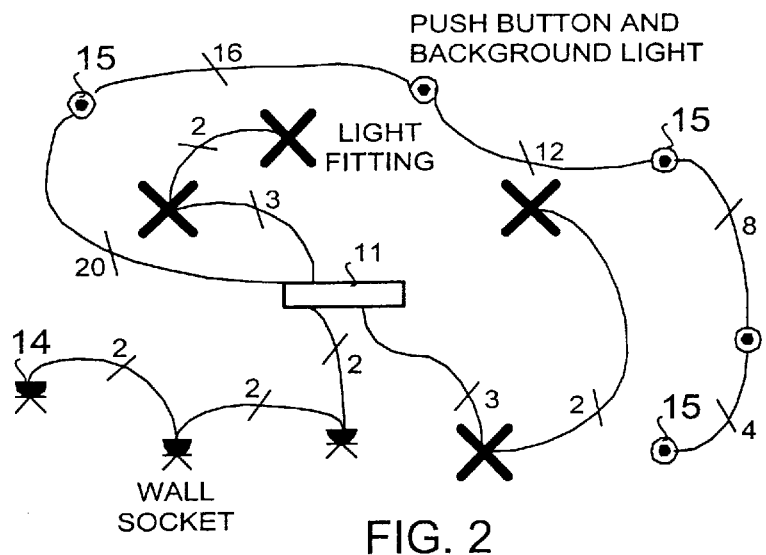
FIG. 2 shows electrification implemented by means of a relay-installation technique.

It must be noted that from the point of view of the principle of the invention, the push-buttons 15 equipped with signal lights could equally well be located in the twin cable that leads along with the phase/neutral mains cable. Placing of said switches 15 in the way shown in the figure physically in their own bus, however, is advantageous to carry out, at least as long as regulations on electric safety do not allow semiconductor mains switches already supplied by several manufacturers. During the transitional stage, relay-control located in the main distribution board 11 may be used, whereby no twin cable bus in accordance with the invention is wired to the mains voltage side. In that case, the bus (conduit A) composed of the twin cable is used for controlling the relays only, the solution thus corresponding to the known technique shown in FIG. 2, except that only one common twin cable 32 would be required for all of the push-buttons 15 shown in FIG. 2, said cable forming the bus in accordance with the invention. Despite the transitional stage arrangement of this kind, installing the method of the invention is easy and advantageous.

It must also be noted that, although in the example of FIG. 3 there are two physically separate wire branches (in conduits A and B), however, they logically form one bus common to all operating devices. The physical topology of the network is of no importance from the point of view of the invention, but the bus may be connected e.g. to one unbroken branch that leads through all operating devices, or it may have an arbitrary number of branches at the desired points. (It is recommended, however, to start the main branches directly from the pin row connector of the control unit, which reduces resistive attenuation of the signal in the wires.)

The bus of the local area network arrangement of the invention is thus in practice made of twisted pair. The thickness of the wire may vary within the range 0.10–0.75 mm$^2$, depending on the number of the operating devices located successively in the same wire branch, and the total length of the bus.

A control unit 11 transmits to the twin cable a constant frequency (analog) carrier signal, substantially sinusoidal in its basic form, both data and power being sent to the nodes by means of said signal. In the following, a carrier with a frequency of 20 kHz is used as an example. (Thus, the wavelength of the signal is always more than 5000 m, and no reflections appear in the wire branches. The frequency is also above the audio frequencies for preventing cross-talk, and sufficiently far below the RF frequencies, so that filtering of high-frequency interferences will not be-a problem.)

A time-division network has been formed of the network, in which network each operating device (node) has been assigned a time-window corresponding to its own device identification number. This window or time-slot is equal in length to one cycle of a carrier (the length of a cycle is 50 $\mu$s in this example).

Figure 4A:
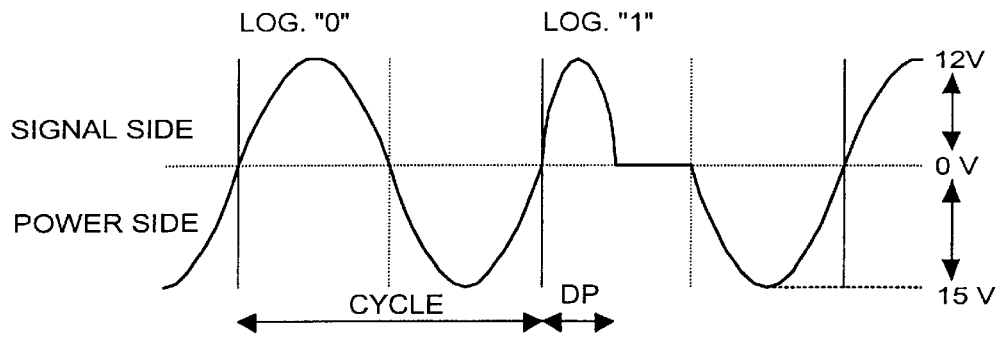
FIG. 4a illustrates a signal transmitted by the control unit of the network of the invention.

FIG. 4a shows a signal sent to the bus by the control unit 11. Only the first half of the carrier cycle may be used for transferring data to the operating device corresponding to said cycle. The latter half cycle is used for power transmission to all operating devices. During the first half cycle, either a logical zero, corresponding to the unchanging signal form, or a logical one, corresponding to a 40-kHz data pulse and marked with reference symbol DP in the figure is transmitted (the correspondences may also naturally be the opposite).

Figure 4B:
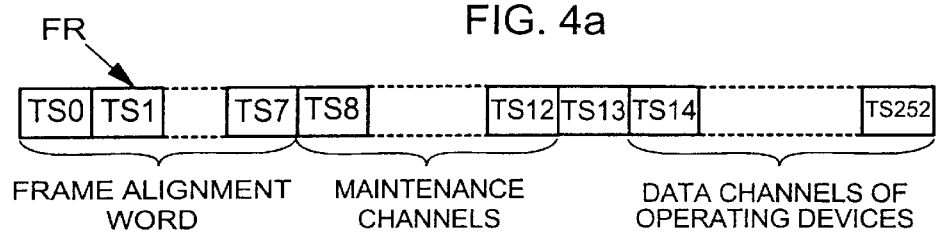
FIG. 4b illustrates a frame structure formed by the signal of FIG. 4a, FIG. 4c shows a block diagram of the control unit.

The control unit thus transmits data towards the operating devices in successive transmission frames, each of which comprises a predetermined number of carrier signal wave cycles. One of these frames is illustrated in FIG. 4b by marking the time-slots corresponding to the cycles of the carrier with reference symbols TS0 . . . TS252. Each frame, marked with reference symbol FR, starts with a predetermined frame alignment word, which may be e.g. a bit pattern 01111110 (time-slots TS0 . . . TS7) eight bits in length. Thus, it is not possible that six successive "1" states occur in a signal in any other situation, but during this alignment word. This has been prevented so that in the numbering of the operating devices, there is a blank at every sixth operating device, and there is thus no need to send "1" data in said time-slot either.

The following five data bits after the alignment word are assigned for managing the system (said time-slots TS8 . . . TS12 form the maintenance channels 1 . . . 5). Thereafter, there is one empty time-slot in the frame, whereafter the time-slots of 200 operating devices (set as the maximum number of the operating devices in this example) follow in the order in accordance with the location number of the operating device, so that, however, every sixth position is empty. This results as the length of one frame (8+5+(1+5)×

40) bits, i.e. 253 bits(time-slots). Thus, one bit may be transferred per each operating device within time 253×50 μs=12.65 ms.

For accomplishing a sufficient interference margin, a node (like also the control unit) must be able to interpret the received data during several, e.g. eight successive frames as the same, unchanging state, before the new state becomes valid. The value 8×12.65 ms=101.2 ms, which is a sufficiently short response time, is thus obtained as the response time that is required for the state transition.

In the other direction, i.e. from the operating device towards the control unit, data transmission takes place in form of current information, so that a current pulse corresponding to "1" data is provided from the connection unit of the operating device during the positive half cycle of the time-slot of said operating device, said pulse being identified by the control unit. This is disclosed in closer detail below in connection with FIG. 7a.

The control of the operating devices in the network always takes place via the control unit, in other words, not even the push-button belonging to the operator device itself can directly command the operator device in question, e.g. a light fitting, into an on-or off-state, but the control information provided by the push-button always goes via the control unit first. The control unit interprets the information supplied from the push-button, and, provided that the information is sensible, the control unit will control the operating device by sending control data in the time-slot corresponding to the operating device. The controlled operating device may be located anywhere along the bus, not necessarily beside the push-button from which the control information was given. In the local area network of the invention, control thus takes place so that when the push-button of the node is pushed, information is sent to the control unit, which is the only place in the network which stores the information on which an operating device in the network is operated by the push of the push-button in question. On the basis of this information, the control unit controls one or more operating devices, which are linked in its memory together with the push-button that was pushed.

Figure 4C:
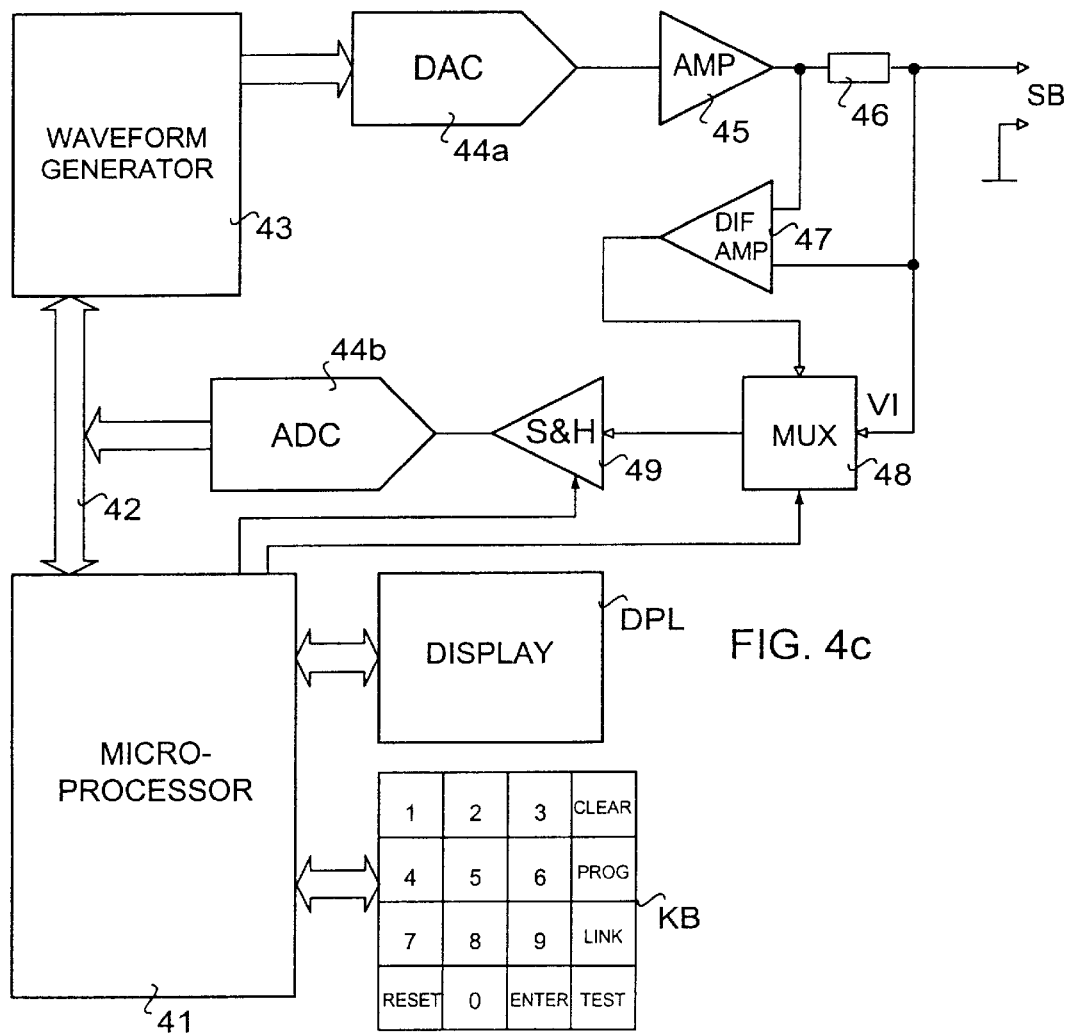

In the local area network arrangement of the invention, the control unit is thus the only place possessing "intelligence". Its processor is responsible for generating the carrier and the outgoing data pulses, as well as interpreting the incoming data pulses. The block diagram of the control unit is shown in FIG. 4c. The "core" of the control unit is the above-mentioned microprocessor 41, which comprises e.g. a real-time clock with battery back-up and the interfaces that are required for connecting the microprocessor to the surrounding circuits or systems. The microprocessor controls a waveform generator 43 through bus 42, said generator generating the carrier signal. The generator 43 comprises a transmission register for each node. The microprocessor writes in these registers the control information (one or zero) depending on how the operating device of each node is controlled. The waveform generator is a sequence machine that continuously reads the transmission registers, and generates during the first half of each cycle a wave in the shape of either a logical one or a logical zero in accordance with the content of the register, and during the second half a constant-form wave. The output signal of the generator is fed via a D/A converter 44a and an output amplifier 45 to a bus SB. As the information coming from the node to the control unit arrives in the form of current information, there is a current measuring resistor 46 between the output of the output amplifier and the second wire of the bus SB, the terminals of the resistor being connected to the inputs of a differential amplifier 47. The current information obtained from the differential amplifier 47 is connected to a multiplexer 48, from which it is further connected via a sampling amplifier 49 and an A/D converter 44b to the microprocessor. The microprocessor obtains from the waveform generator the information on when the outgoing waveform is at its peak value, and the microprocessor directs amplifier 49 to take a sample of returning current at the moment in question. The control unit thus finds out whether the node corresponding to the current time-slot is sending data to the control unit. Voltage information VI is applied to a second input of the multiplexer, said information being used for monitoring the faultless operation of the network, i.e. it is monitored so that the amplitude will not fall excessively due to excessive load of the network.

In addition, a keyboard KB and a display DPL are connected to the microprocessor, so that the user can make configurations of his own, and manage the system. Managing the system is disclosed in greater detail below.

Figure 5A:
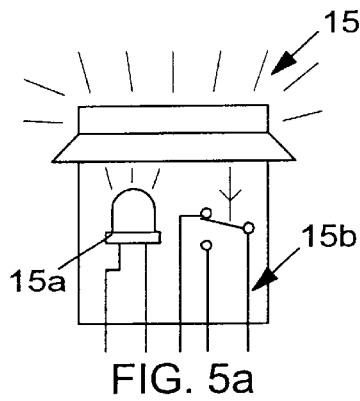
FIG. 5a–5c show different operating devices used in the network.

An operating device comprised in a network node may be e.g. a push-button switch 15 of the type shown in FIG. 5a, equipped with a device, e.g. a LED 15a, giving a signal light. An operating device of this type does not require separate adapter circuitry, but it may be connected directly to the connection unit of the node, as the connection unit of the node is capable of (a) directly producing the energy sufficient for the back lighting of the switch, and (b) leading in the information provided by switch 15b.

Figure 5B:
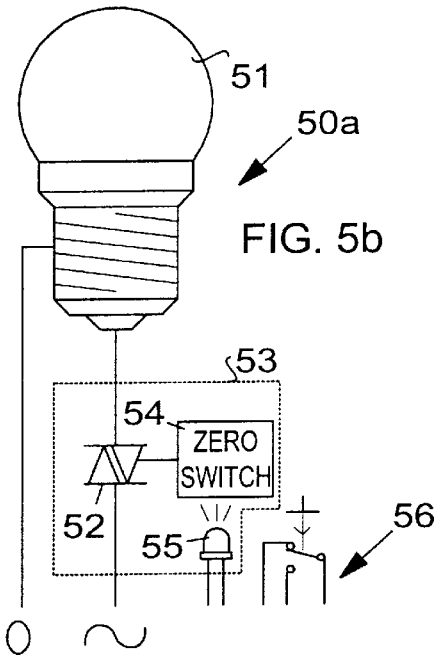

The operating device may also be like a device 50a shown in FIG. 5b, having a load supplied with the line voltage by means of an ON/OFF function, such as a lamp 51, which is connected to the connection unit of the node by means of a separate adapter circuitry element. In this case, the adapter circuitry element comprises a control circuit 53 comprising a triac 52 connected to the phase conductor of the lamp, a zero cross detector 54 controlling the triac, and a LED 55 controlling the zero cross detector. Opto-isolated, triac-based network switches of this kind are supplied by several manufacturers. The user interface visible to the user is in this case composed of the lamp 51 (controlled by the control unit) and a switch 56, from which the user gives information for the direction of the control unit (LED 55 is in this case invisible, as it is located in the control circuit of the triac). In practice, the control circuit may be e.g. of the type SP1110, manufactured by International Rectifier, in the U.S.A. A similar circuit is supplied by other manufacturers, as well.

Figure 5C:
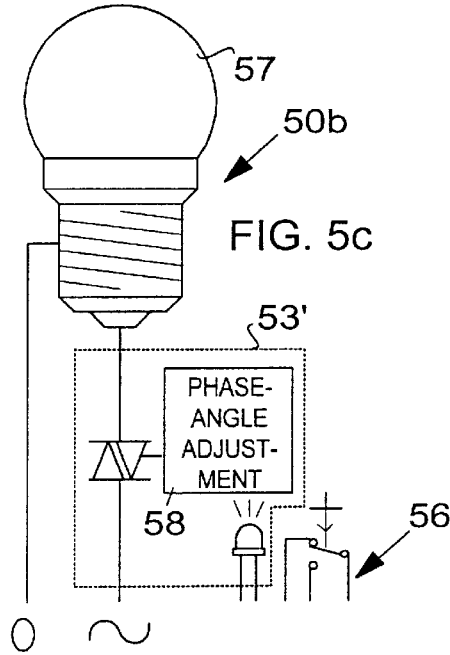

The operating device may also be like a device 50b shown in FIG. 5c, having a load supplied with a variable line voltage, such as a lamp dimmer 57. This example is similar to that in FIG. 5b, except that in this case there is a phase-angle controller 58 in place of the zero cross detector of the control circuit. The control circuit 53 of this kind based on phase-angle adjustment may be composed of discrete components.

All of the operating devices disclosed above are thus based on the use of a LED; in the switch (FIG. 5a), the LED functions as a component giving back lighting, whereas in the control of the mains power (FIGS. 5b and 5c) the LED, in turn, functions as an isolating control device by means of which a low-voltage bus is isolated from the line voltages. In this way, a basic structure as identical as possible is obtained for all the nodes. Generally speaking, it may be stated that an operating device is a device which gives the user some response (e.g. light), and from which control information may be given for the direction of the control unit, e.g. by means of a switch attached to the operating device. Different operating devices may be, for example, motors, heating appliances, different meters, etc.

Figure 6:
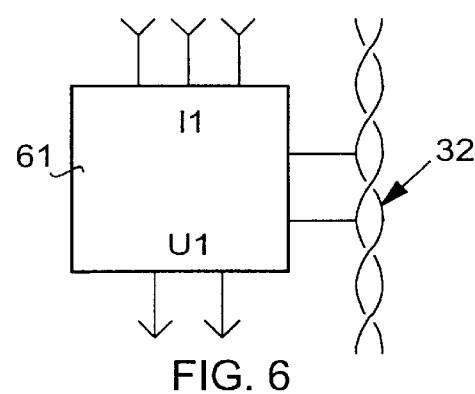
FIG. 6 shows the principle of the bus interface.

FIG. 6 illustrates the principle of the bus interface to be implemented by means of a connection unit belonging to an individual node. A connection unit 61 is non-polarized with respect to the bus interface, in other words, its connectors may be connected to the words of a twin cable 32 both ways. An output U1 of the connection unit controls LED 15a or 55 of the operating device, and its input I1 is connected to a change-over push-button (switch) 15b or 56 receiving the information provided by the push-button switch.

The connection unit 61 of the node comprises an analog section connected onto the bus, and a digital section connected after the analog section, said digital section interpreting signals fed to it by the analog section, generated by the analog section from the signal it has received from the bus. The digital section also controls the transmission that takes place for the direction of the control unit in response to the control information provided by the user.

Figure 7B:
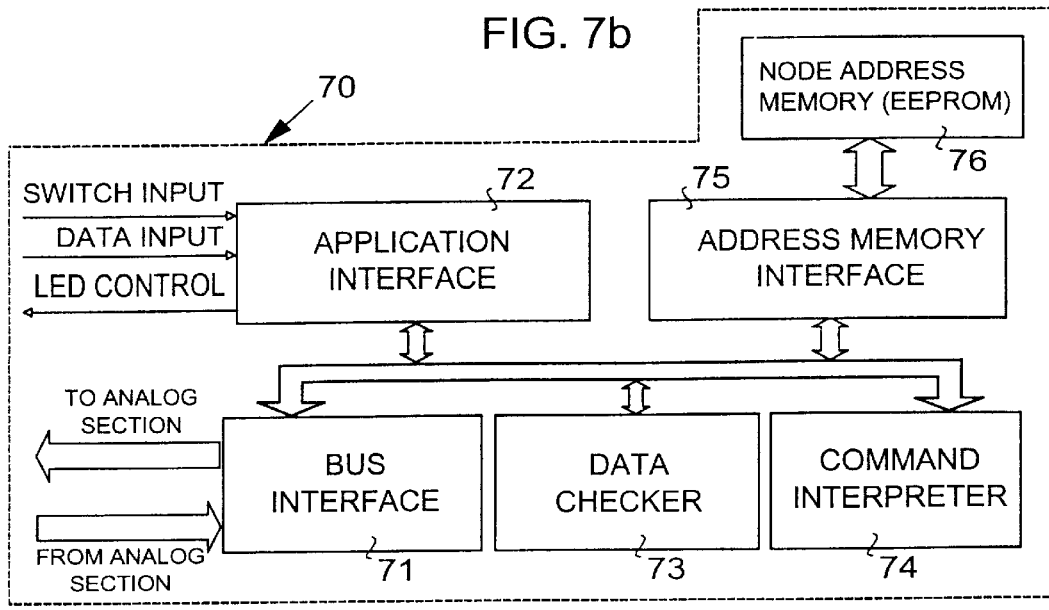
FIG. 7b is a block diagram illustrating a digital section of the connection unit.
Figure 7A:
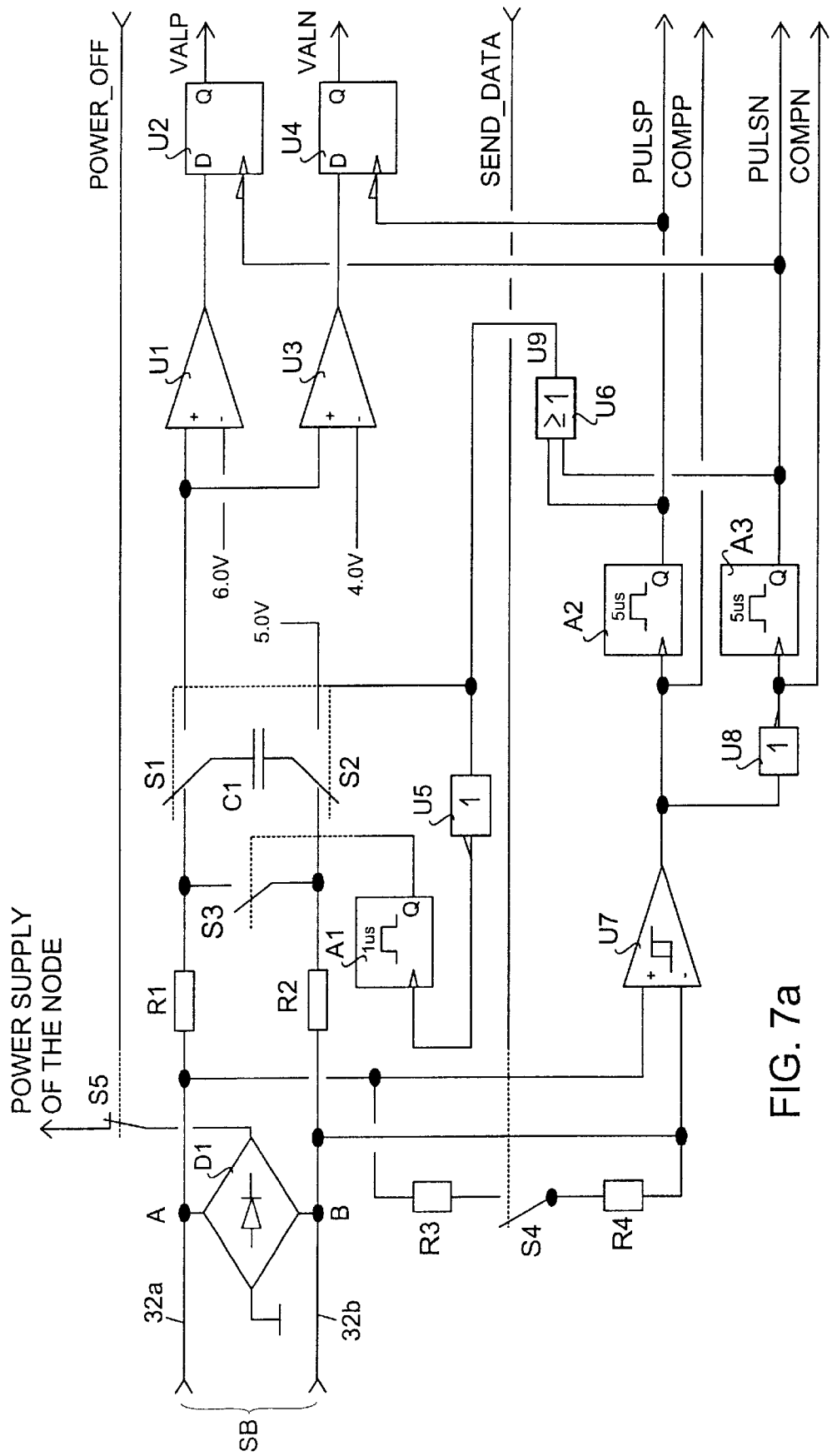
FIG. 7a shows an analog section of the connection unit implementing the bus interface.

FIG. 7a shows the connection of the analog section of the connection unit in principle. The task of the analog section is to separate the data signal from the power supply, take the supply voltage (controlled by the digital section) from the half cycles intended for power supply, and increase the load (controlled by the digital section) with a current of a predetermined magnitude for transferring data during the half cycle assigned for the transfer, during a carrier cycle corresponding to the address number of the node. All signals marked on the right side in FIG. 7a are either signals to be connected from the analog section to the digital section, or signals to be connected from the digital section to the analog section.

Wires 32a and 32b of the bus SB implemented by means of a twin cable 32 are connected to two opposite terminals A and B of a rectifier bridge D1. The third terminal of the rectifier bridge is connected to the ground, and the fourth terminal, opposite to it, to a power switch S5 controlled with a signal POWER_OFF from the digital section. At the initial stage (before the connection unit is synchronized with the carrier), the power switch S5 is turned to the closed position in the way shown in FIG. 7a.

Terminals A and B are connected to the respective input terminals of a comparator U7. The output of the comparator (signal COMPP) is connected to the input of a first pulse generator circuit A2, and also directly to the digital section. The output of the comparator is also connected via an inverter U8 to the input of a second pulse generator circuit A3 and inverted to the digital section (signal COMPN). The outputs of pulse generator circuits A2 and A3 are connected to the digital section (signals PULSP and PULSN), as well as to the inputs of an OR-gate U6. An output signal U9 of the ORgate controls switches S1 and S2, which are used for connecting a measurement capacitor C1 either via resistors R1 and R2 to the input terminals A and B of the analog section, or alternatively to comparators U1 and U3. The output signal of the OR-gate U6 is also connected via an inverter U5 to the input of a third pulse generator circuit A1. The output of this pulse generator circuit controls a switch S3, by means of which the terminals of the measurement capacitor C1 are short circuited.

The output of comparator U1 is connected to a data input D of a first D-type flip-flop U2, and correspondingly, the output of comparator U3 to a data input D of a second D-type flip-flop U4. D-type flip-flop U2 is clocked with the output signal PULSN of the second pulse generator circuit A3, and D-type flip-flop U4 with the output signal PULSP of the first pulse generator circuit A2 (clocking at the falling edge of the pulse). The outputs of the D-type flip-flops (signals VALP and VALN) are connected to the digital section.

Figure 8:
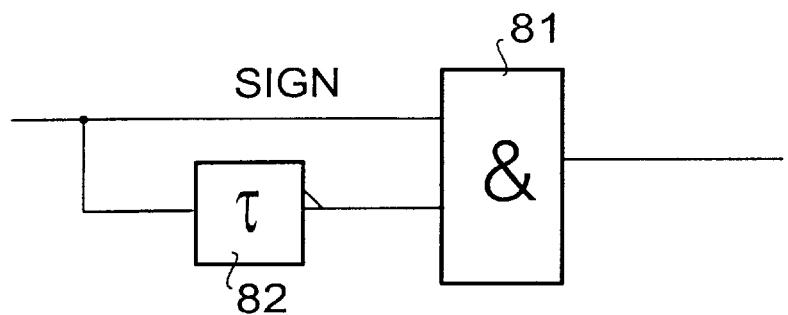
FIG. 8 shows a pulse generator circuit used in the analogy section of FIG. 7a, and FIG. 9 is a time diagram showing a signal incoming to the analog section, and signals to be generated from it in the analog section.

The pulse generator circuits are similar to the one shown in FIG. 8, comprising an AND-gate 81, to the first input of which the signal is directly connected. To the second input, the signal is connected via an inverting delay circuit 82. The circuit thus generates, at the rising edge of the input signal SIGN, a pulse the length of which is determined by the delay τ of the delay circuit. In this exemplary solution, circuits A2 and A3 provide a pulse of 5 μs in length, and circuit A1 a pulse 1 μs in length.

Figure 9:
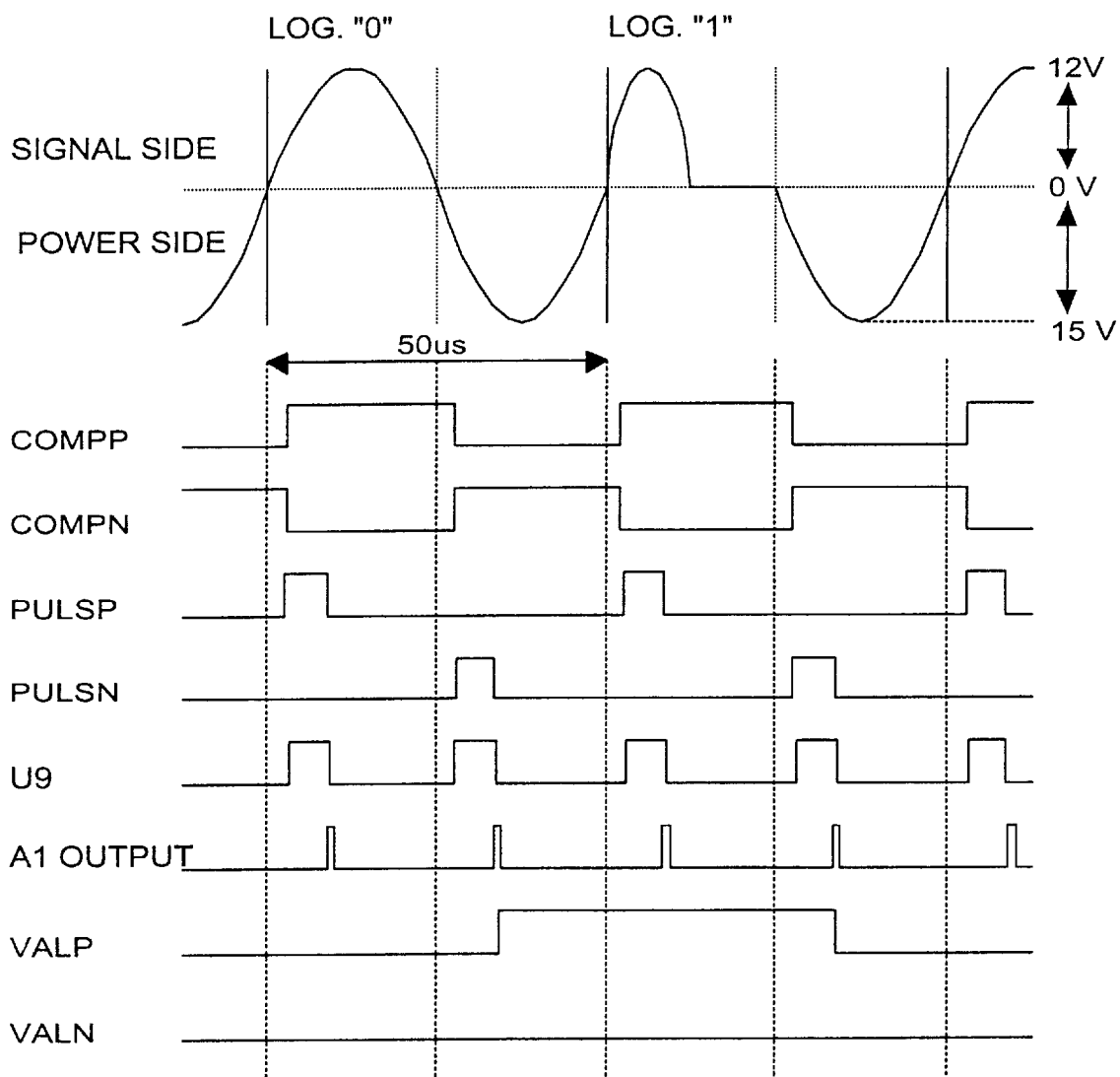

In the following, the operation of the analog section will be described in more detail, in addition to FIG. 7a, with reference to FIG. 9 illustrating the signal transmitted by the control unit, and the signals to be generated from it in the analog section.

Interpretation of the incoming signal is carried out separately for each half cycle. By means of a comparator U7 comparing the input signals differentially, and provided with a hysteresis, a clock signal COMPP is formed, said signal being locked onto the frequency and the phase of the carrier and having a phase shift with respect to the carrier, said shift corresponding to the hysteresis. At the rising edges of signal COMPP, pulses PULSP are generated, and at the falling edges correspondingly pulses PULSN. These signals are combined in the OR-circuit U6 to signal U9, having a pulse of 5 μs in length after each edge of the output signal COMPP of comparator U7.

Before there is a transient point (rising or falling edge) in the output signal COMPP of the comparator examining the polarity of the signal, switches S1 and S2. are in the position shown by FIG. 7a, whereby the current passing through resistors R1 and R2 charges the measurement capacitor C1. The polarity of the charge (voltage) depends on the polarity of the signal, and the amount of charge is proportional to the area of the sianal curve formed by the half-cycle voltage (the energy of the half cycle) and to the time-constant (R1+R2)*C1. During the power feed half cycles, the amount of the charge (i.e. the area or the voltage charged into the capacitor) is always the same in magnitude, and the polarity of the charge is the opposite compared with the charge generated during the half cycles of the signal side. The area of the voltage curve formed during the half cycles of the signal side (and thus the voltage of the capacitor) varies according to that whether "1" data or "0" data has been sent. The area (the voltage of the capacitor) is large when the data is "0", and small when the data is "1".

When a transient point (rising or falling edge) occurs in the output signal of comparator U7, switches S1 and S2 turn to the opposite position controlled by signal U9. Then the second terminal of the capacitor is connected to a fixed voltage +5 V. Comparator U1 compares the voltage of the second terminal with a reference voltage +6 V, and comparator U3 with a reference voltage +4 V (i.e. the comparators compare whether the voltage charged into the capacitor is above or below ±1 V).

Comparators U1 and U3 are allowed a time of 5 μs (the length of the pulse of signal U9) to set, whereafter their output signals are further clocked at the falling edges of pulses of signals PULSN and PULSP via D-type flip-flops to the digital section for further processing. Thereafter, switches S1 and S2 turn capacitor C1 again to the measurement position for the duration of the following half cycle.

Prior to that, however, capacitor C1 is discharged with a short pulse obtained from circuit A1, said pulse turning switch S1 to the closed position for the time of 1 μs.

The interpretation of the current states of the output signals at the clocking moments is carried out in accordance with the following table.

| U1 | U3 | COMPP | State Interpretation |
|----|----|-------|----------------------|
| 0  | 0  | 1     | Negative Polarity/ "0" state |
| 0  | 1  | 1     | Negative Polarity/ "1" state |
| 0  | 1  | 0     | Positive Polarity/ "1" state |
| 1  | 1  | 0     | Positive Polarity/ "0" state |

The information on the positive and the negative, polarity (half cycle) is obtained directly from the output of comparator U7 (signal COMPP). For instance, negative polarity/"0" state indicates a negative half cycle, and reception of "0" data during the previous half cycle.

As charge states of the same magnitude are continuously obtained to capacitor C1 during negative half cycles (the form of which does not change), signal VALN remains in zero all the time (cf. FIG. 9). However, the state of signal VALP varies according to whether "1" data or "0" data is being received. The digital section concludes after this that data is transferred during the positive half cycle, as the signal corresponding to it varies, whereas the signal corresponding to the negative half cycle remains in the same state all the time. As a result, data may be extracted from the received signal.

By using a capacitor C1 connected to a twin cable in the manner shown above in the interpretation of data, comparing the voltage charged over said capacitor by means of two comparators with two different reference values, the interpretation may be carried out in a very simple way. By means of capacitor C1, switches S1–S2 and resistors R1–R2, it is namely possible to carry out integration, sampling and differential amplification. Integration is carried out when capacitor C1 is charged via resistors R1 and R2, sampling is carried out when switches S1 and S2 are turned to the opposite position, and once the switches have turned to the opposite position, a differential value is determined from the signal to be measured. In addition, a galvanic isolation is achieved with the switches. Provided that the information to be transmitted has more than two levels, the comparison is also carried out with more than two reference values.

In the carrier signal, the amplitude (3 volts in this example) of the power feed side (negative half cycle) is slightly higher than the amplitude of the data side (positive half cycle), so that the power be taken from the right half cycles prior to identification of the polarity (i.e. prior to synchronizing of the node), as well. Once the digital section has concluded on which side the control unit is transmitting data, the node is synchronized with the transmitted data, whereby the digital section starts to control the power feed with the signal POWER_OFF, by turning switch S5 to the closed position for the duration of each negative half cycle and turning it to the open position for the duration of the positive half cycles.

Data transmission (transmission of "1" data) from the node to the control unit takes place by means of current pulses, so that the digital section controls switch S4 with the signal SEND_DATA during the positive half cycle of the time-slot corresponding to the address of the node, whereby resistors R3 and R4 are connected between terminals A and B. As the power feed takes place only during the negative half cycles, no changes in the current occur during positive half cycles, whereby the control unit is capable of distinguishing the current load achieved by the node on the bus within the time-slot in question. It is thus possible to transmit data in the same time-slot to both directions.

FIG. 7b is a block diagram illustrating a digital section 70, showing the functions of the digital section. The digital section is not described in detail herein, as it is not related to the actual invention, and it will be easy for a person skilled in the art to implement the functions required from the digital section. A bus interface unit 71 acts as the interface against the analog section (and bus SB), dealing with detection of frame alignment, monitoring and counting of frame alignment, collecting the incoming data and identifying the polarity of the incoming signal. These tasks may also be carried out in the analog section. An application interface unit 72 acts as an interface against the user, dealing with connecting the node to the outside world. In this section, buffering of data (e.g. the control data of the LED) arrived from the bus, and buffering of switch or data information coming from outside are carried out. (The switch information may come e.g. from switches 15b, and the data information from one of the operating devices generating data). In a data check unit 73, checking of arrived data and interference filtering are carried out. (This unit checks that the data remains unchanged during eight successive frames.) The check unit receives from the frame counter of the bus interface unit the information on the phase of the frame, from which information it decodes the address, whereby it is capable of reading data at its own address. A command interpreter 74 interprets commands received from the bus (mostly the commands sent along the maintenance channels), and handles the implementation of the commands. An address memory interface unit 75 comprises the sequence machines that read the node address from a node memory 76, and write the node address to the node memory. In practice, it is advantageous to implement the digital section in form of an ASIC circuit.

In the following, managing the local area network of the invention will be disclosed.

Once the control unit, the bus wired with the twisted pair, and the nodes are installed, configuration of the system is started by first ensuring that the individual address of each operating device is zero. Thereafter, all operating devices are assigned individual addresses. In the third phase, the control unit is informed as to which operating device controls which other operating device, and how. These configurations are carried out by utilizing a push-button located at every operating device (15, 15b, or 56), as well as the keyboard and the display of the control unit.

The reset function of the individual address may be directed jointly to all operating devices, or it may be focused so that it controls only one operating device.

Upon resetting a specific operating device, the control unit asks the address of the device to be reset, and resets it. If the user does not know the address, it may be inquired from the control unit, which asks the user to push the push-button of the operating device in question, whereafter the control unit shows the address on its display.

Upon resetting all the addresses, the control unit checks this operation from the user, whereafter it resets all the non-reset addresses it has found.

Upon resetting the addresses, the control unit sends each time all the operating devices a control code 1101 on maintenance channels 1 . . . 4 during eight times eight frame periods (i.e. 64 frame periods), and simultaneously the eight-bit address (eight times) of the operating device to be reset along maintenance channel 5. (due to a sufficient interference margin, the same information is sent eight times consecutively)

The control unit is able to find unregistered operating devices by sending a code 1100 "return sent data", whereby, as "1" data is transmitted in all the time slots corresponding to the operating devices, all the nodes the individual address of which is unequal to zero reply by transmitting the "1" data back.

The control unit may also continuously keep a record of the nodes comprised in the network, so that the user may be given an alarm of an abnormal disappearance of a node.

Programming of the addresses is started by commanding the control unit by means of its keyboard to the programming state, whereby the control unit starts to send a code 1110 to the operating devices. Then the control unit takes from the free addresses the smallest address, which the user may change if desired. Thereafter, the user pushes the push-button of the operating device to which the address in question is desired. The information on the push is transmitted along maintenance channel 3 (as the node does not yet have an individual time-slot in the frame) to the control unit. When the control unit detects that data starts to arrive along maintenance channel 3, it changes to a command code 1111, and sends along maintenance channel 5 an 8-bit address code during 8 times 8 frame periods, which address code becomes valid immediately after the validity check carried out in the node. After this, the data sent by the user via the push-button appears in the time-slot determined by the address code, whereby the control unit may immediately check it and thereafter return to the basic programming state (code 1110), simultaneously switching on the light of the operating device in question (either LED 15a or lamp 51 or 57). This is a sign to the user that the operating device in question has received an individual address, and the push-button may be released. This sequence takes place in about one second. Provided that the following operating device to be programmed may have the following free address as its individual address, the user only has to push the push-button of said operating device and wait for the above-mentioned second until the light is switched on. These procedures are continued until all operating devices have received an individual address, whereafter the programming state is cancelled by giving the corresponding command to the control unit from its keyboard.

The last stage from the point of view of configuration is linkage, i.e. specification, in which the user informs the control unit on which operating device controls which other operating device.

The starting point is the fact that the individual push-button of each operating device controls at least the operating device in question. For example, the push-button of a standard lamp always controls said standard lamp, but the information provided in the linkage indicates, whether the push-button of the standard lamp also controls some other operating devices.

The linkage between two operating devices is carried out at its simplest so that the user commands the control unit into the connecting state by giving the corresponding command from the keyboard of the control unit, as a result of which the control unit starts to transmit a code 1011 of the connecting state on maintenance channels 1 . . . 4. Thereafter, the control unit requests the user to push the push-buttons of the operating devices which are to be combined. Once the user has pushed the push-buttons of all the operating devices to be combined (e.g. 6 push-buttons equipped with a back lighting, and two ceiling lights), the user returns to the control unit and gives an accept command from its keyboard. After this, when the push-button of any device belonging to the combined group is pushed, all the operating devices of the group change their state.

It must further be noted that the system makes no distinction between the types of the operating devices, in other words, a light (FIG. 5b) (or its push-button) located on the ceiling could equally well be set to control the back light of a push-button (FIG. 5a) located on the wall, although only the opposite control manner is sensible.

One operating device may be separated from the group by giving a corresponding command from the keyboard, whereby the control unit starts to send code 1001 indicating this. Next, the user pushes the push-button of the operating device the combinations of which are to be released. Thereafter, the user accepts the release from the control unit, whereafter it becomes valid.

There is a separate command for releasing the group. When the user pushes, after giving this command, the push-button of any of the operating devices and accepts the release from the control unit, the control unit will remove all the linkages of this group.

To summarize the above, the following table shows control channels belonging to the management of the system. The four-bit codes to be sent along maintenance channels 1 . . . 4 are shown in the latter table. The directions of transmission and reception are seen from the point of view of the control unit. In the latter table, a response channel refers to the number of the maintenance channel.

| Number of maintenance channel | Direction of transmission | Direction of reception |
|---|---|---|
| 1 | Code 0 (LSB) | |
| 2 | Code 1 | |
| 3 | Code 2 | Programming (Address) |
| 4 | Code 3 (MSB) | |
| 5 | Data | |

| Transmitted Binary Code | Response Channel | Control Command |
|---|---|---|
| 0000 | | No control |
| 0001 | | LED on -test |
| 0010 | | |
| 0011 | | |
| 0100 | | |
| 0101 | | |
| 0110 | | |
| 0111 | | |
| 1000 | | |
| 1001 | | Remove from linkage |
| 1010 | | Release entire linkage |
| 1011 | | Link |
| 1100 | | Return sent data |
| 1101 | | Reset the individual address |
| 1110 | | Prepare for Programming the individual address |
| 1111 | | Programming of the Individual address |

By means of the arrangement disclosed above, it is possible to define e.g. only a switch-off function for a certain push-button, in other words, with a push of the push-button it is possible to switch off (but not to switch on) specific light fittings. In this case, the control unit thus transmits further the information provided from the push-button, depending on what is the switching state of the operating devices linked to the push-button. In this respect, the system of the invention also clearly differs from the conventional solutions Although the invention has been disclosed above with reference to the examples in the attached drawings, it is obvious that the invention is not limited thereto, but it may be modified within the inventive idea set forth above and in the attached claims. Although the local area network arrangement of the invention has been described above by means of a light fitting system, the uses may vary in a number of ways. Similarly, more detailed embodiments and principles may vary without deviating from the scope and the spirit of the invention. The information to be transmitted may have, as already mentioned above, more than two levels, although it is true that the nodes become slightly more complex this way. The basic form of the carrier signal may also vary, e.g. a square wave may be used instead of a sine wave.

I claim:

1. A local area network arrangement for implementing a control system, comprising:

a low-voltage bus for functioning as a common transmission path for the network;

a plurality of connection units for connecting controllable operating devices to the bus; and a control unit common to the connection units and connected to the bus for controlling the connection units; wherein the control unit is operable to transmit to the low-voltage bus a substantially constant frequency low-voltage carrier signal having consecutive cycles, and to receive data from the connection units via the low-voltage bus;

a predetermined number of the cycles of the carrier signal compose one transmission frame, such that each connection unit of the network corresponds to at least one cycle of the transmission frame;

the network is operable to dedicate at least one of the cycles of one transmission frame for transmitting only data to a specific one of the connection units corresponding to the dedicated at least one cycle during a first half of the dedicated at least one cycle, and providing only power to all of the connection units during a second half of the dedicated at least one cycle; and the connection units are operable to substantially eliminate changes in current drawn via the low-voltage bus during the first half of the dedicated at least one cycle.

2. A network arrangement as claimed in claim 1, wherein the carrier signal is substantially sinusoidal.

3. A network arrangement as claimed in claim 1, being operable to transmit data from the specific one of the connection units to the control unit during the first half of the dedicated at least one cycle.

4. A network arrangement as claimed in claim 3, wherein the connection units are operable to interpret data from the control unit using a capacitor equipped with switch means for selectively connecting terminals of the capacitor between a first position such that the capacitor is connected across the bus and a second position such that the capacitor is connected to reference means for comparing a voltage charged over the capacitor while in the first position with reference values.

5. A network arrangement as claimed in claim 4, wherein the connection units transmit data to the control unit in the form of current information.

6. A network arrangement as claimed in claim 5, wherein the connection units transmit data to the control unit by connecting a resistive load across the bus.

7. A network arrangement as claimed in claim 1, wherein the carrier signal has an amplitude which is higher during half cycles for conveying power than during half cycles for transmitting data from the control unit.

8. A network arrangement as claimed in claim 1, wherein data sent from the control unit to the connection units and data sent from the connection units to the control unit includes only one bit during each cycle.

9. A network arrangement as claimed in claim 8, further including a first operating device and a second operating device associated with the first operating device, and wherein a bit transmitted during a cycle represents switch ON/OFF information, and the control unit is operable to transmit the switch information during several cycles of the transmission frame, such that for a first part of the cycles, the switch information is for switching on or off a mains voltage of the first operating device, and for a second part of the cycles, the switch information is for controlling the second operating device to inform a user whether or not the mains voltage of the first operating device is switched on or off.

10. A network arrangement as claimed in claim 9, wherein both the first operating device and the second operating device include an optical component wherein the optical component functions in the first operating device as an opto-isolator between the mains voltage and connection unit corresponding to the first operating unit, and functions in the second operating device as a signal light visible to the user.

11. A network arrangement as claimed in claim 1, wherein data is transmitted from the control unit to the connection units in the form of energy information represented by an area formed by a waveform of the carrier signal.

* * * * *

UNITED STATES PATENT AND TRADEMARK OFFICE
CERTIFICATE OF CORRECTION

PATENT NO. : 5,920,253
DATED : July 6, 1999
INVENTOR(S) : Seppo Laine

It is certified that error appears in the above-indentified patent and that said Letters Patent is hereby corrected as shown below:

On the title page, in Field No. [22], the PCT filing date, change "Sep. 5, 1995" to --Sep. 8, 1995--.

Signed and Sealed this

Second Day of May, 2000

Attest:

Attesting Officer

Q. TODD DICKINSON
Director of Patents and Trademarks